(12) United States Patent
Kim (10) Patent No.: US 10,378,639 B2
(45) Date of Patent: Aug. 13, 2019

(54) REDUCER OF ELECTRIC POWER STEERING APPARATUS

(71) Applicant: MANDO CORPORATION, Gyeonggi-do (KR)

(72) Inventor: Jong Han Kim, Seoul (KR)

(73) Assignee: MANDO CORPORATION, Gyeonggi-Do (KR)

(*) Notice: Subject to any disclaimer, the term of this patent is extended or adjusted under 35 U.S.C. 154(b) by 0 days.

(21) Appl. No.: 15/881,680

(22) Filed: Jan. 26, 2018

(65) Prior Publication Data

US 2018/0216720 A1 Aug. 2, 2018

(30) Foreign Application Priority Data

Feb. 1, 2017 (KR) .................. 10-2017-0014214

(51) Int. Cl.
| | |
|---|---|
| *F16H 1/16* | (2006.01) |
| *F16H 1/20* | (2006.01) |
| *F16H 57/028* | (2012.01) |
| *B62D 5/04* | (2006.01) |
| *F16H 57/00* | (2012.01) |
| *F16H 57/021* | (2012.01) |
| *F16H 57/039* | (2012.01) |
| *F16C 1/00* | (2006.01) |
| *F16C 35/077* | (2006.01) |
| *F16H 57/02* | (2012.01) |

(52) U.S. Cl.
CPC ......... *F16H 57/028* (2013.01); *B62D 5/0409* (2013.01); *F16C 1/00* (2013.01); *F16C 35/077* (2013.01); *F16H 1/16* (2013.01); *F16H 57/0025* (2013.01); *F16H 57/021* (2013.01); *F16H 57/039* (2013.01); *B62D 5/0403* (2013.01); *F16H 2057/0213* (2013.01); *F16H 2057/02082* (2013.01)

(58) Field of Classification Search
CPC .... F16H 57/028; F16H 57/0213; F16H 55/24; F16C 1/00; B62D 5/0409
See application file for complete search history.

(56) References Cited

U.S. PATENT DOCUMENTS

| | | | | |
|---|---|---|---|---|
| 2010/0260448 | A1* | 10/2010 | Hafermalz | B62D 3/12 384/215 |
| 2014/0083794 | A1* | 3/2014 | Ishii | B62D 5/0409 180/444 |
| 2015/0360719 | A1* | 12/2015 | Kang | F16H 57/021 384/222 |
| 2016/0318545 | A1* | 11/2016 | Uchihara | B62D 5/0454 |

* cited by examiner

*Primary Examiner* — Jake Cook (74) *Attorney, Agent, or Firm* — Ladas & Parry, LLP

(57) ABSTRACT

A reducer of an electric power steering apparatus include: a worm shaft having a first worm shaft bearing and a second worm shaft bearing respectively on a first end connected to a motor and an opposite second end; a gear housing receiving the first worm shaft bearing, the second worm shaft bearing, and the worm shaft; a first support member disposed between the second worm shaft bearing and the gear housing and having outer supporting portions on the outer side thereof to support the inner side of the housing and inner supporting portions on the inner side thereof to support the second worm shaft bearing; and a second support member coupled to the gear housing and supporting the outer side of the second worm bearing shaft through the first support member.

13 Claims, 6 Drawing Sheets

REDUCER OF ELECTRIC POWER STEERING APPARATUS

CROSS REFERENCE TO RELATED APPLICATION

This application claims priority from Korean Patent Application No. 10-2017-0014214, filed on Feb. 1, 2017, which is hereby incorporated by reference for all purposes as if fully set forth herein.

BACKGROUND OF THE INVENTION

1. Field of the Invention

The present disclosure relates to a reducer of an electric power steering apparatus. In more detail, the present disclosure relates to a reducer of an electric power steering apparatus that can accurately assist a steering wheel operation force by a driver by preventing spacing due to wear of a worm shaft and a worm wheel, reducing shock noise transmitted from the surface of a road and rattling noise by backlash, preventing excessive operation force on the worm shaft and the worm wheel even when moisture absorption expansion of the worm wheel occur, and minimizing a gap change and noise.

2. Description of the Prior Art

A reducer of common electric power steering apparatus is provided to enable a driver to smoothly and stably steer by controlling a motor through an electronic control unit in a vehicle in accordance with the driving conditions of the vehicle so that a worm wheel is rotated by the motor and torque of the worm wheel is transmitted to a steering shaft in addition to the torque applied through a steering wheel by the driver.

However, according to the reducers of electric power steering apparatuses in the related art, a worm and a worm wheel that are rotated by a motor are worn over time and a gap is generated therebetween, thereby causing noise.

Further, noise is further caused by shock noise that is transmitted through wheels and a steering shaft from the surface of a road and backlash between the worm and the worm wheel.

Further, due to moisture absorption expansion of the worm wheel that is made of plastic, the operation force of the worm shaft and the worm wheel is excessively increased, the gap is changed, and the noise is also increased, so steering force by a driver is not transmitted well through a steering wheel.

SUMMARY OF THE INVENTION

The present disclosure has been made in an effort under this background and provides a reducer of an electric power steering apparatus that can prevent spacing due to wear of a worm shaft and a worm wheel and reduce shock noise transmitted from the surface of a road and rattling noise by backlash.

Further, the present disclosure provides a reducer of an electric power steering apparatus that can accurately assist a driver to operate a steering wheel by preventing excessive operation force of a worm shaft and a worm wheel and minimizing a gap change and noise even if moisture absorption expansion of the worm wheel occurs.

Aspects of the present disclosure are not limited thereto and other aspects may be clearly understood by those skilled in the art from the following description.

An aspect of the present disclosure provides a reducer of an electric power steering apparatus, the reducer including: a worm shaft having a first worm shaft bearing and a second worm shaft bearing respectively on a first end connected to a motor and an opposite second end; a gear housing receiving the first worm shaft bearing, the second worm shaft bearing, and the worm shaft; a first support member disposed between the second worm shaft bearing and the gear housing and having outer supporting portions on the outer side thereof to support the inner side of the housing and inner supporting portions on the inner side thereof to support the second worm shaft bearing; and a second support member coupled to the gear housing and supporting the outer side of the second worm bearing shaft through the first support member.

According to embodiments having these shape and structure, in a reducer of an electric power steering apparatus, it is possible to prevent spacing due to wear of a worm shaft and a worm wheel and reduce shock noise transmitted from the surface of a road and rattling noise due to backlash.

Further, according to embodiments, it is possible to prevent excessive operation force of a worm shaft and a worm wheel and minimize a gap change and noise even if moisture absorption expansion of the worm wheel occurs, so it is possible to accurately supplement the force for operating a steering wheel by a driver.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, embodiments will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
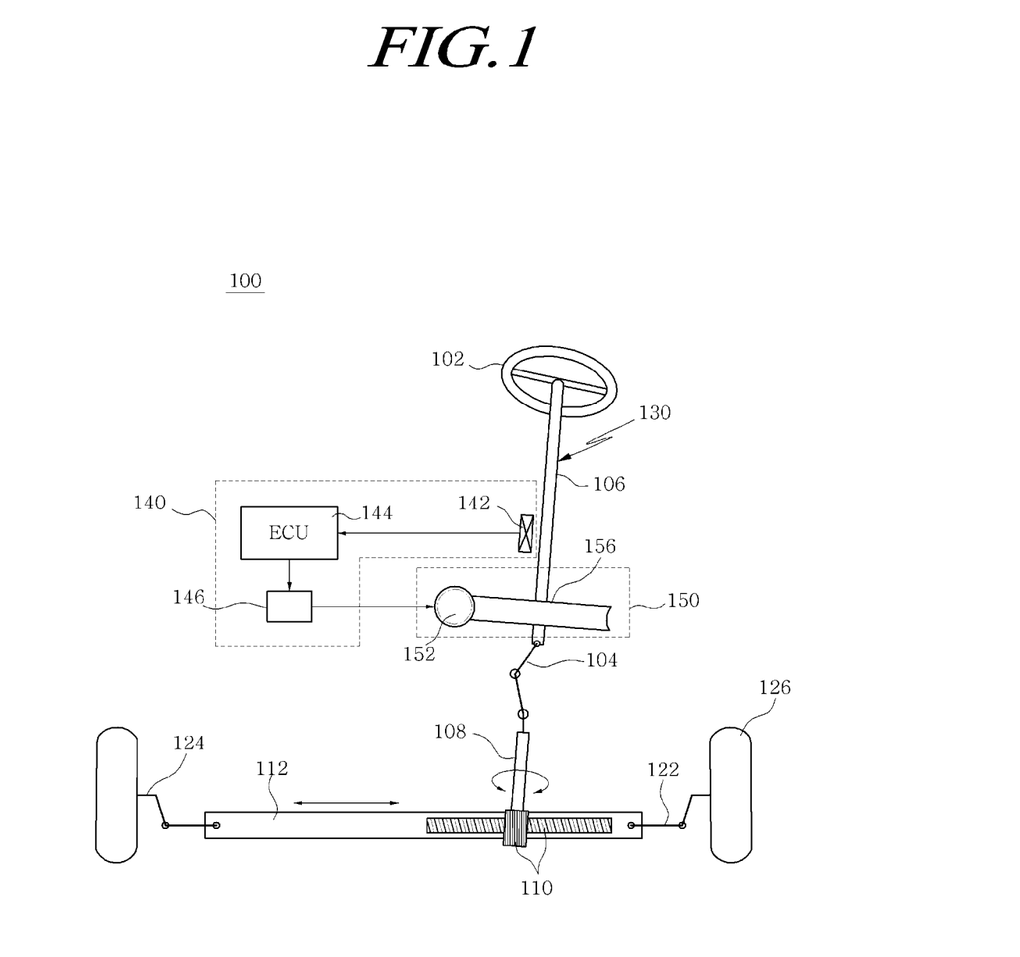
FIG. 1 is a view showing the configuration of an electric power steering apparatus according to embodiments.
Figure 2:
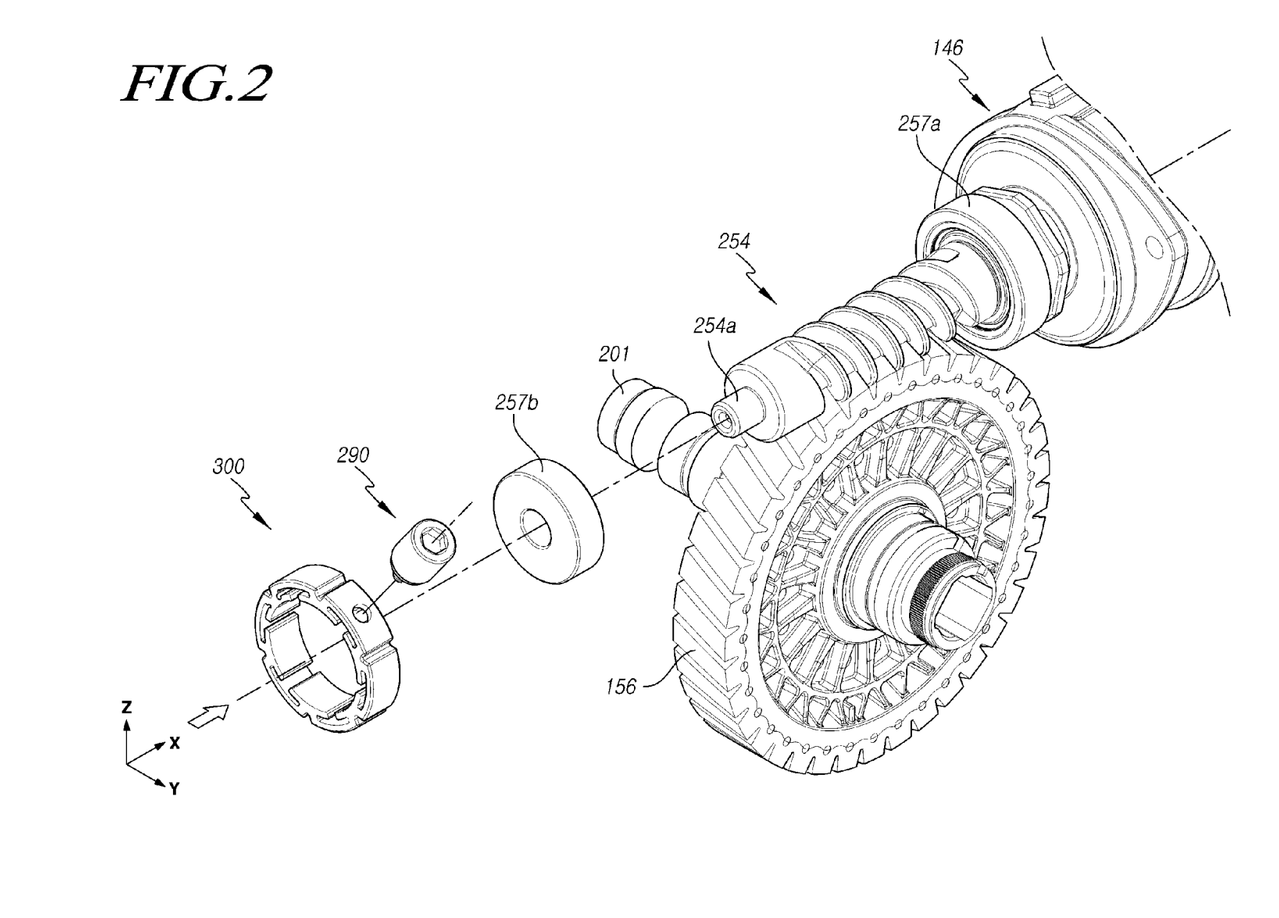
FIG. 2 is an exploded perspective view showing a reducer of an electric power steering apparatus according to embodiments.
Figure 3:
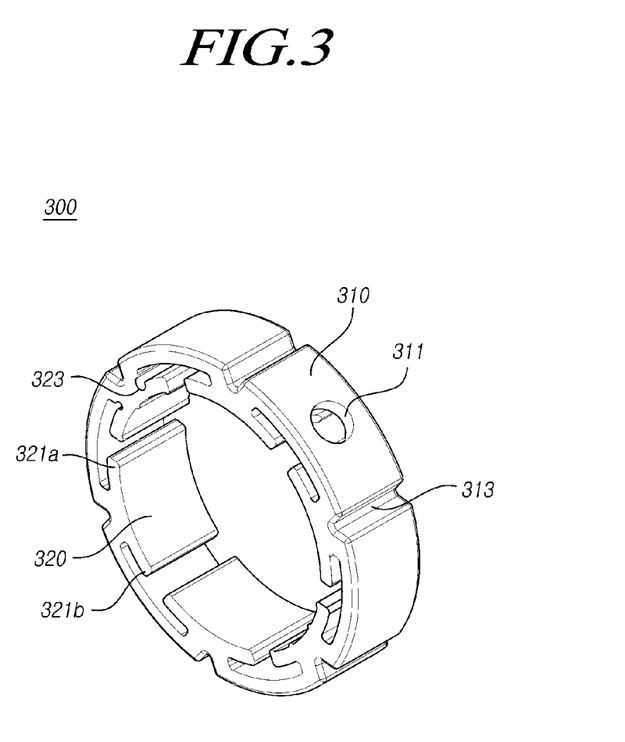
FIG. 3 is a perspective view showing a portion of the reducer of an electric power steering apparatus according to embodiments.
Figure 4:
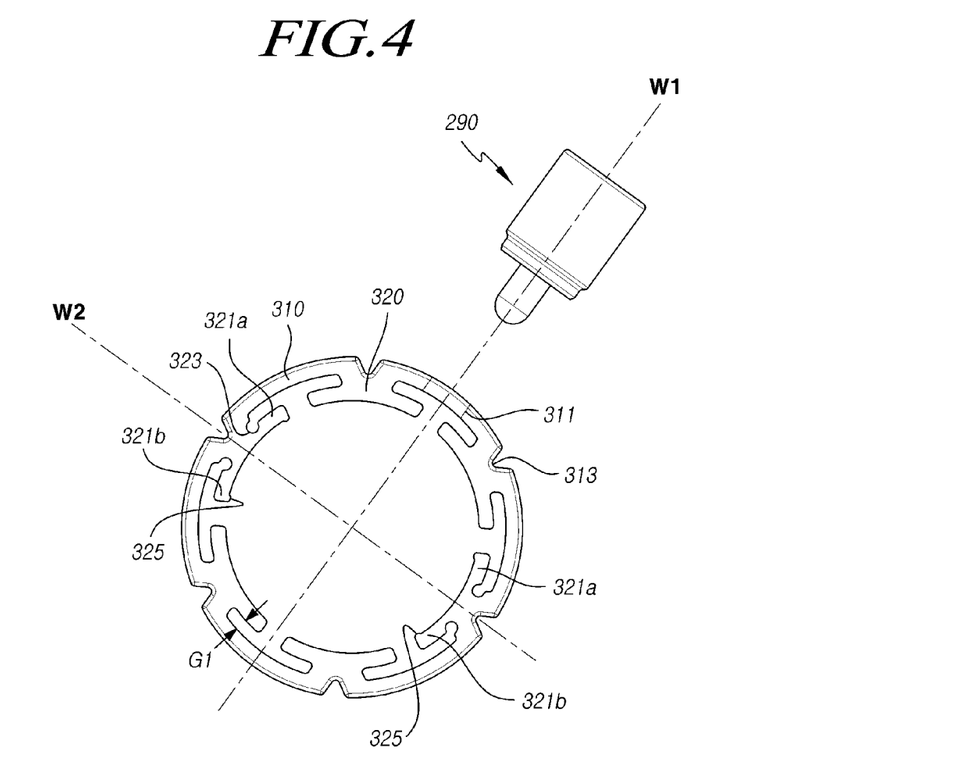
FIGS. 4 and 5 are front views showing a portion of the reducer of an electric power steering apparatus according to embodiments.
Figure 5:
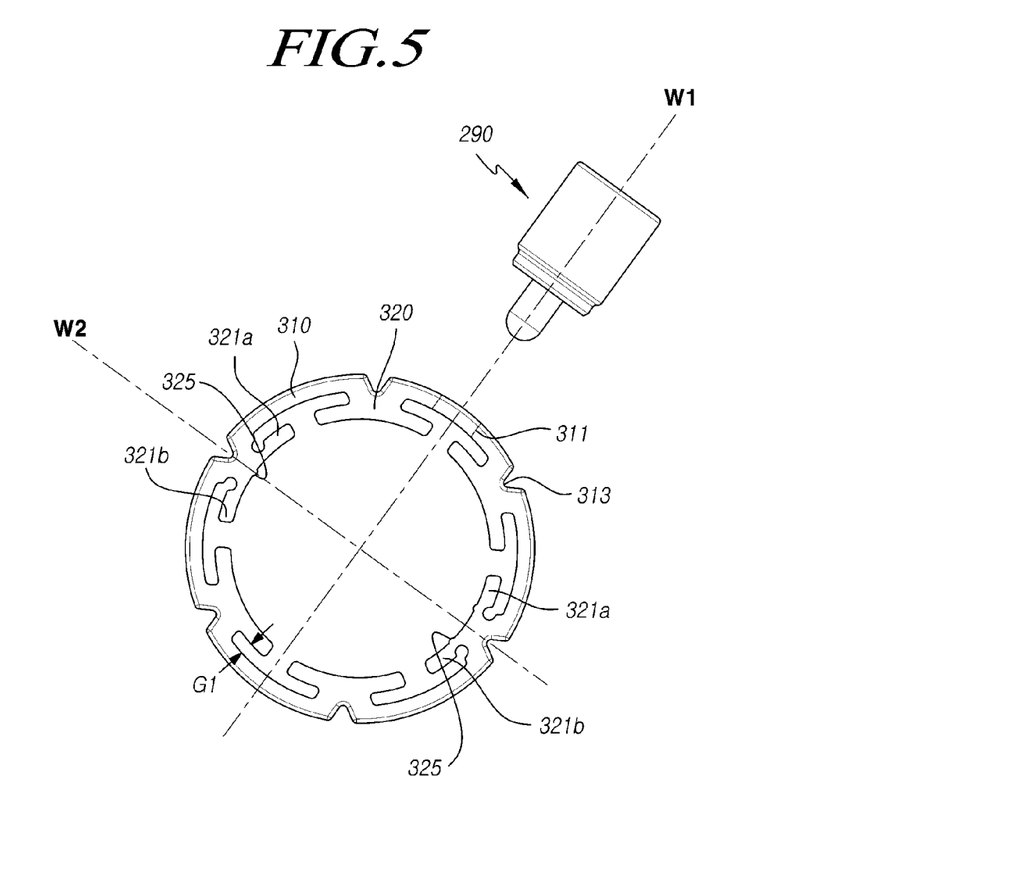
Figure 6:
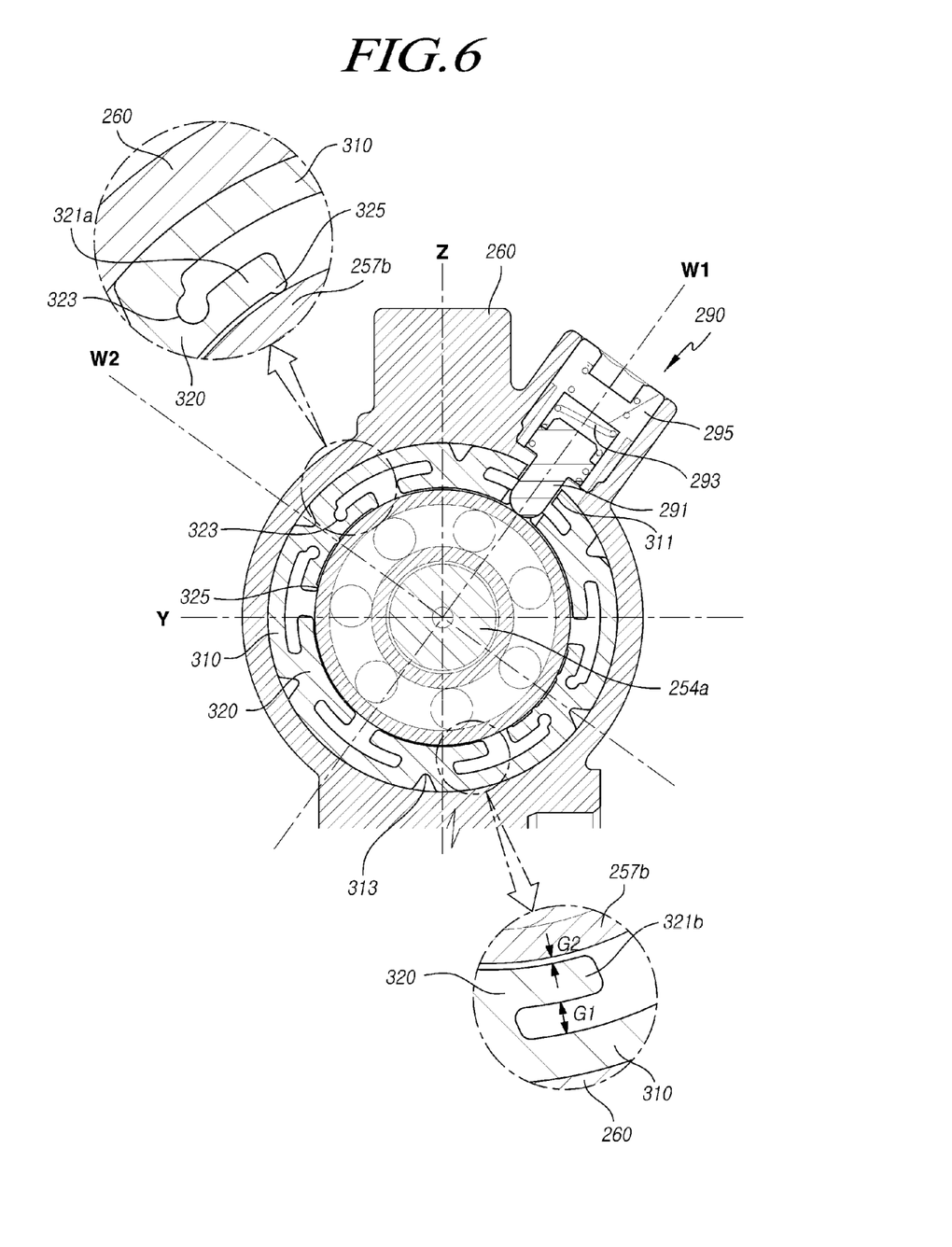
FIG. 6 is a cross-sectional view showing the reducer of an electric power steering apparatus according to embodiments.

FIG. 1 is a view showing the configuration of an electric power steering apparatus according to embodiments, FIG. 2 is an exploded perspective view showing a reducer of an electric power steering apparatus according to embodiments, FIG. 3 is a perspective view showing a portion of the reducer of an electric power steering apparatus according to embodiments, FIGS. 4 and 5 are front views showing a portion of the reducer of an electric power steering apparatus according to embodiments, and FIG. 6 is a cross-sectional view showing the reducer of an electric power steering apparatus according to embodiments.

Referring to the figures, an electric power steering system 100 according to embodiments includes a steering system 130 connected from a steering wheel 102 to two wheels 126 and an auxiliary power unit 140 providing auxiliary steering power to the steering system 130.

The steering system 130 includes a steering shaft 106 having a first end connected to the steering wheel 102 to rotate with the steering wheel 102 and a second end connected to a pinion shaft 108 through a pair of universal joints 104. The pinion shaft 108 is connected to a rack bar 112 through a rack-pinion assembly 110 and both ends of the rack bar 112 are connected to the wheels 126 of the vehicle through a tie rod 112 and a knuckle arm 124.

The auxiliary power unit 140 includes: a torque sensor 142 that senses torque applied to the steering wheel 102 by a driver and outputs electrical signals proportioned to the sensed torque; an Electronic Control Unit (ECU) 144 that generates controls signals on the basis of the electrical signals transmitted from the torque sensor 142; a motor 146 that generates auxiliary power on the basis of the control signals transmitted from the ECU 144; and a reducer 150 that includes a worm 152 and a worm wheel 156 to transmit the auxiliary power generated by the motor 146 to the steering shaft 106.

Accordingly, in the electric power steering apparatus, torque that is generated by rotation of the steering wheel 102 is transmitted to the rack bar 112 through the rack-pinion assembly 110 and auxiliary power generated in correspondence to the torque by the motor 146 is transmitted to the rack bar 112.

That is, the torque generated by rotation of the steering wheel 102 and the auxiliary power generated by the motor 146 axially move the rack bar 112.

The reducer of an electric power steering apparatus according to embodiments includes: a worm shaft 254 having a first worm shaft bearing 257a and a second worm shaft bearing 257b respectively on a first end connected to a motor shaft and an opposite second end 254a; a gear housing 260 receiving the first worm shaft bearing 257a, the second worm shaft bearing 257b, and the worm shaft 254; a first support member 300 disposed between the second worm shaft bearing 257b and the gear housing 260 and having outer supporting portions 310 on the outer side to support the inner side of the housing 260 and inner supporting portions 320 on the inner side to support the second worm shaft bearing 257b; and a second support member 290 coupled to the gear housing 260 and supporting the outer side of the second worm bearing shaft 257b through the first support member 300.

The worm shaft 254 and the worm wheel 156 are operated together by power from the motor 146 and rotate the steering shaft 201, whereby the reducer supplements a steering force by a driver. When the motor 146 is operated, the first worm bearing 257a and the second worm bearing 257b fitted on the first end and the second end of the worm shaft 254 that is operated with the shaft of the motor 146 support the rotating worm shaft 254. The worm wheel 156 and the worm shaft 254 that are operated with the steering shaft 201 are disposed inside the gear housing 260.

The first support member 300 and the second support member 290 combined with the gear housing 260 support the second worm shaft bearing 257b, thereby compensating for spacing between the worm shaft 254 and the worm wheel 156 and absorbing shock and rattling noise.

The first support ring 300 has a ring shape and is disposed between the second worm bearing 257b and the gear housing 260 and has the outer supporting portions 310 on the outer side to support the inner side of the gear housing 260 and the inner supporting portions 320 on the inner side to support the second worm bearing 257b.

The first support member 300 has first grooves 313 axially disposed, recessed radially inward, and arranged around the outer side of the outer supporting portion 310, and the outer supporting portions 310 are circumferentially arranged with the first grooves 313 therebetween.

Accordingly, when the first support member 300 is elastically deformed inward to be fitted into the gear housing 260, it can be elastically deformed into the empty spaces of the first grooves 313. Therefore, the first support member 300 can be easily assembled and can maintain radial elastic supporting force after being assembled.

A hole 311 through which the second support member 290 supporting the outer side of the second worm bearing 257b is inserted extends through the side of an outer supporting portion 310.

The inner supporting portions 320 disposed on the inner side of the first support member 300 protrude radially inward at the positions of the first grooves 313 and are not circumferentially connected to each other, but spaced from each other.

Accordingly, when the worm shaft 254 and the second worm shaft bearing 257b are radially moved by a shock load transmitted to the worm shaft 254 from the surface of a road, vibration transmitted by operation of the motor 146, and expansion of the worm wheel 156 due to moisture absorption, the first support member elastically deformed into the spaces between the inner supporting portions 320, whereby it can support the second worm bearing 257b.

A gap G2 is defined between the inner sides of the inner supporting portions 320 and the outer side of the second worm shaft bearing 257b. The gap G2 from the second worm shaft bearing 257b is maintained in a normal state, that is, when there is no shock from the surface of a road and the amount of wear and moisture absorption of the worm wheel 156 correspond to standard design amounts.

Accordingly, when shock is transmitted from the surface of a road or the amount of wear and moisture absorption of the worm wheel 156 exceed the standard design amounts, the second worm bearing 257 be can be radially moved by a supporting load of the second support member 290.

The inner supporting portions 320 each have flexible supporting portions 321a and 321b circumferentially extending and defining a radial gap G1 with the outer supporting portions 310, so when the second worm shaft bearing 257b is radially moved, the flexible supporting portions 321a and 321b can support the second worm shaft bearing 257b by elastically deforming radially outward.

Further, a gap G2 is defined between the flexible supporting portions 321a and 321b and the outer side of the second worm shaft bearing 257b, so when shock is transmitted from the surface of a road or the amount of wear and moisture absorption of the worm wheel 156 exceed the standard design amounts, the second worm shaft bearing 257b can be radially moved by the supporting load of the second support member 290.

At least one of the inner supporting portions 320 has second grooves 323 recessed inward at the portions connected with the flexible supporting portions 321a and 321b, so the flexible supporting portions 321a and 321b can be more elastically deformed radially outward.

The second grooves 323 are curved with a circular or arc cross-section, so the flexible supporting portions 321a and 321b are easily radially and elastically deformed. Further, the portions where the second grooves 323 are arranged are not deformed or broken even if elastic deformation is continuously repeated.

The inner supporting portion 320 having the second grooves 323 is positioned between 60° and 120° circumferentially from the supporting direction of the second support member 290 when seen in the axial direction of the worm shaft 254, as shown in FIG. 6, so the inner supporting portion 320 supports movement in the shock absorption direction when a shock load transmitted from the surface of a road is transmitted to the worm shaft 254 through the worm wheel 156.

Further, at least one of the inner supporting portions 320 has supporting projections 325 that are disposed on the inner sides of the flexible supporting portions 321a and 321b and supported in contact with the second worm shaft 257b, thereby supporting in close contact with the second worm shaft bearing 257b.

The inner supporting portion 320 with the supporting projections 325 is positioned between 60° and 120° circumferentially from the supporting direction of the second support member 290 when seen in the axial direction of the worm shaft 254, as shown in FIG. 6, so the inner supporting portion 320 supports movement in the shock absorption direction when a shock load transmitted from the surface of a road is transmitted to eh worm shaft 254 through the worm wheel 156.

That is, in the second support member 290, a rod 291 supporting the second worm bearing shaft 257b compensates for spacing between the worm shaft 254 and the worm wheel 156 by the elasticity of an elastic member 293 coupled to a control plug 295 combined with the gear housing 260, and the supporting direction of the second support member 290 is positioned in the spacing compensation direction W1 of the worm shaft 254 and the worm wheel 156, as shown in FIG. 6.

Accordingly, when the reducer is used for a long period of time, gear teeth of the worm wheel 156 is worn and spacing is generated, so it is required to compensate for the spacing. In this case, the worm shaft 254 is not simply supported toward the worm wheel 156, but is supported in the direction of an axis W1 inclined at a predetermined angle from a virtual axis Z connecting the center of the worm shaft 254 and the center of the worm wheel 156 in a plane perpendicular to the worm shaft 254 so that the worm shaft 254 is supported in the opposite direction to reacting force transmitted from worm gear teeth.

The supporting angle of the second support member 290 is set to 25°~45° in consideration of the wear by the reacting force of the gear teeth of the worm shaft 254 and the worm wheel 156.

There is provided a coordinate system for describing the reacting force of the worm shaft 254 and the worm wheel 156 and the spacing compensation direction. Assuming in the coordinate system that the axial direction of the worm shaft 254 is an X axis, the axis perpendicular to the X axis and connecting the centers of the worm shaft 254 and the worm wheel 156 is a Z axis, and an axis perpendicular to the X axis and Z axis is a Y axis, in FIG. 6 showing a plane perpendicular to the X axis, the direction of the axis W1 that is the supporting direction of the second support member 290 is the spacing compensation direction and the inner supporting portion 320 having the second grooves 323 is positioned between 60° and 120° from the axis W1.

However, it is exemplified in FIG. 6 that the inner supporting portion 320 having the second grooves 323 is positioned on an axis W2 making 90° from the axis W1 of which the direction is the supporting direction of the second support member 290.

Accordingly, when the worm shaft 254 and the second worm shaft bearing 257b are moved by the second support member 290 in the direction of the axis W1 that is the spacing compensation direction, the inner supporting portion 320 having the supporting projections 325 on the axis W2 making 90° from the axis W1 supports both sides in the spacing compensation direction. Further, when a shock load is transmitted to the worm shaft 254 through the worm wheel 156 from the surface of a road, movement can occur in the shock absorption direction by the second grooves 323 of the inner supporting portion 320.

When the gear teeth of the worm wheel 156 is worn due to use for a long period of time, spacing is generated by the wear, and it is required to compensate for the spacing, movement occurs by the gap G2 in the supporting direction W1 of the second support member 290 and the inner supporting member 320 having the supporting projections 325 supports both sides of the second worm shaft bearing 257b.

Further, when movement occurs due to moisture absorption of the worm wheel 156 and shock from the surface of a road, a load is transmitted in a direction (direction of the axis W2) perpendicular to the supporting direction W1 of the second support member 290 and the flexible supporting portions 321a and 321b are easily elastically deformed by the second grooves 323, thereby preventing excessive operation force of the worm shaft 254 and the worm wheel 156 and absorbing shock.

On the other hand, two or more supporting projections 325 may be circumferentially arranged with a gap therebetween, and as shown in FIG. 4, the supporting projections 325 may be disposed respectively at both ends on the inner sides of the flexible supporting portions 321a and 321b.

The supporting projections 325 may be disposed at two pairs of flexible supporting portions 321a and 321b facing each other in the radial direction of the worm shaft, in the flexible supporting portions 321a and 321b, so they can strongly support the outer side of the second worm shaft bearing 257b when a load is transmitted in a direction (the direction of the axis W2 perpendicular to the supporting direction W1 of the second support member 290.

Further, as shown in FIG. 5, one supporting projection 325 may be disposed at one of the pairs of flexible supporting portions 321a and 321b radially facing each other and two supporting projections 325 circumferentially spaced from each other may be disposed at the other pair of flexible supporting portions 321*a* and 321*b*.

The supporting projections widen the supporting area of the outer side of the second worm bearing 257*b* when spacing compensation movement is made by the second support member 290, thereby increasing the supporting force and minimizing friction on the support portion.

According to embodiments having these shape and structure, in a reducer of an electric power steering apparatus, it is possible to prevent spacing due to wear of a worm and a worm wheel and reduce shock noise transmitted from the surface of a road and rattling noise due to backlash.

Further, according to embodiments, it is possible to prevent excessive operation force of a worm shaft and a worm wheel and minimize a gap change and noise even if absorption expansion of the worm wheel occurs, so it is possible to accurately supplement the force for operating a steering wheel by a driver.

Although all the elements constituting embodiments of the present disclosure have been described above as being combined into a single unit or combined to be operated as a single unit, the present disclosure is not necessarily limited to such embodiments. That is, at least two elements of all structural elements may be selectively joined and operate without departing from the scope of the present disclosure.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

The above embodiments have been described merely for the purpose of illustrating the technical idea of the present disclosure, and those skilled in the art will appreciate that various modifications and changes are possible without departing from the scope and spirit of the present disclosure. Therefore, the embodiments of the present disclosure are not intended to limit, but to illustrate the technical idea of the present disclosure, and the scope of the technical idea of the present disclosure is not limited by the embodiments. The scope of the present disclosure shall be construed on the basis of the accompanying claims in such a manner that all of the technical ideas included within the scope equivalent to the claims belong to the present disclosure.

What is claimed is:

1. A reducer of an electric power steering apparatus, the reducer comprising:
   a worm shaft having a first worm shaft bearing and a second worm shaft bearing respectively on a first end connected to a motor and an opposite second end;
   a gear housing receiving the first worm shaft bearing, the second worm shaft bearing, and the worm shaft;
   a first support member disposed between the second worm shaft bearing and the gear housing and having outer supporting portions on an outer side of the first support member to support an inner side of the housing and inner supporting portions on an inner side of the first support member to support the second worm shaft bearing; and
   a second support member coupled to the gear housing and supporting an outer side of the second worm bearing shaft through the first support member,
   wherein the first support member has first grooves recessed radially inward and arranged around an outer side of the outer supporting portion, and
   wherein the inner supporting portions protrude radially inward at the positions of the first grooves and are circumferentially spaced from each other.

2. The reducer of claim 1, wherein a first gap is defined between inner sides of the inner supporting portions and an outer side of the second worm shaft bearing.

3. The reducer of claim 2, wherein the inner supporting portions each have flexible supporting portions circumferentially extending and defining a radial gap with the outer supporting portions.

4. The reducer of claim 3, wherein a second gap is defined between the flexible supporting portions and the outer side of the second worm shaft bearing.

5. The reducer of claim 4, wherein at least one of the inner supporting portions has second grooves recessed inward at portions connected with the flexible supporting portions.

6. The reducer of claim 5, wherein the second grooves are curved with a circular or arc cross-section.

7. The reducer of claim 5, wherein the inner supporting portion having the second grooves is positioned between 60° and 120° circumferentially from a supporting direction of the second support member when seen in the axial direction of the worm shaft.

8. The reducer of claim 5, wherein at least one of the inner supporting portions has supporting projections that are disposed on inner sides of the flexible supporting portions and supported in contact with the second worm shaft.

9. The reducer of claim 8, wherein the inner supporting portion having the supporting projections is positioned between 60° and 120° circumferentially from a supporting direction of the second support member when seen in the axial direction of the worm shaft.

10. The reducer of claim 8, wherein two or more supporting projections are circumferentially spaced from each other.

11. The reducer of claim 8, wherein the supporting projections are disposed at both ends of the inner sides of the flexible supporting portions, respectively.

12. The reducer of claim 8, wherein one or more of the supporting projections are disposed at each of two pairs of flexible supporting portions facing each other toward a center of the worm shaft.

13. The reducer of claim 12, wherein one of the supporting projections is disposed at one of the pairs of flexible supporting portions facing each other and two of the supporting projections circumferentially spaced from each other are disposed at the other of the pairs of flexible supporting portions.

* * * * *